US007522840B2

(12) United States Patent
Dybsetter et al.

(10) Patent No.: US 7,522,840 B2
(45) Date of Patent: Apr. 21, 2009

(54) ADJUSTABLE BOOT SPEED IN AN OPTICAL TRANSCEIVER

(75) Inventors: Gerald L. Dybsetter, Scotts Valley, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 346 days.

(21) Appl. No.: 11/114,983

(22) Filed: Apr. 26, 2005

(65) Prior Publication Data

US 2006/0093363 A1 May 4, 2006

Related U.S. Application Data

(60) Provisional application No. 60/623,358, filed on Oct. 29, 2004.

(51) Int. Cl.
*G06F 15/177* (2006.01)
*H04B 10/00* (2006.01)

(52) U.S. Cl. .............................. 398/135; 713/1; 713/2; 710/62

(58) Field of Classification Search ................ 398/135; 713/1, 2

See application file for complete search history.

(56) References Cited

U.S. PATENT DOCUMENTS 5,075,792 A * 12/1991 Brown et al. ................ 398/115
6,807,630 B2 * 10/2004 Lay et al. ....................... 713/2
2002/0069354 A1 * 6/2002 Fallon et al. ................... 713/2
2002/0083316 A1 * 6/2002 Platenberg et al. ............. 713/2
2003/0236972 A1 * 12/2003 Harrington et al. ............. 713/2
2004/0022537 A1 2/2004 Mecherle et al.

OTHER PUBLICATIONS

William Hogan et al., "Low-Cost Optical Sub-Assemblies for Metro Access Applications", Electronic Components and Technology Converence, Jun. 2004, Proceedings, 54th, vol. 1, pp. 203-207.*

* cited by examiner

*Primary Examiner*—Kenneth N Vanderpuye
*Assistant Examiner*—Danny W Leung
(74) *Attorney, Agent, or Firm*—Workman Nydegger

(57) ABSTRACT

An operational optical transceiver configured to dynamically adjust the boot speed of the optical transceiver boot process. The optical transceiver includes a persistent memory, a system memory, and a controller configured to load information from the persistent memory to the system memory. The controller initiates the boot process at a slower boot speed and begins to load information from the persistent memory to the system memory. The controller then detects boot speed data in the information being loaded to the system memory that defines a faster boot speed. In response to the detected boot speed data, the controller continues the boot process by loading additional information from the persistent memory to the system memory at a second boot speed that is faster than the first boot speed.

20 Claims, 2 Drawing Sheets

ADJUSTABLE BOOT SPEED IN AN OPTICAL TRANSCEIVER

CROSS-REFERENCE TO RELATED APPLICATIONS

This application claims the benefit of U.S. Provisional Application No. 60/623,358, filed Oct. 29, 2004, which is incorporated herein by reference in its entirety.

BACKGROUND OF THE INVENTION

1. The Field of the Invention

The present invention relates generally to optical transceivers. More specifically, the present invention relates to adjusting the boot speed in an optical transceiver.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier. What would be advantageous is to improve the efficiency of such a controller when operating to control the various features of the optical transceiver.

BRIEF SUMMARY OF THE INVENTION

The forgoing problems with the prior state of the art are overcome by the principles of the present invention, which relate to an optical transceiver configured to dynamically adjust the speed of the boot process. The optical transceiver includes a persistent memory, a controller, and a system memory. During the boot process, the optical transceiver loads information from persistent memory to the system memory.

The controller initializes the boot process at a slower boot speed that all persistent memory sources that may be used by the optical transceiver may implement. As the information is being loaded, the controller detects boot speed data contained in the information. The boot speed data defines a faster speed for the boot process.

As a result of detecting the speed data, the controller continues the boot process by loading additional information from the persistent memory to the system memory at a newer, faster boot speed. Accordingly, there is no need to configure the controller to the actual boot speed of the persistent memory before the boot process begins. By initiating the boot process at a boot speed that all persistent memories can implement and then detecting data defining the actual speed, new persistent memory sources can be added to the optical transceiver without a negative effect on the boot process speed. Accordingly, faster boot speeds are achieved.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENT

The principles of the present invention relate to an operational optical transceiver configured to dynamically adjust the boot speed of the optical transceiver boot process. The optical transceiver includes a persistent memory, a system memory, and a controller configured to load information from the persistent memory to the system memory. The controller initiates the boot process at a slower boot speed and begins to load information from the persistent memory to the system memory. The controller then detects boot speed data in the information being loaded to the system memory that defines a faster boot speed. In response to the detected boot speed data, the controller continues the boot process by loading additional information from the persistent memory to the system memory at a second boot speed that is faster than the first boot speed, and that is equal to or a fraction of the boot speed represented by the boot speed data loaded from the persistent memory. An example operational optical transceiver environment will first be described. Then, the operation in accordance with the invention will be described with respect to the operational environment.

Figure 1:
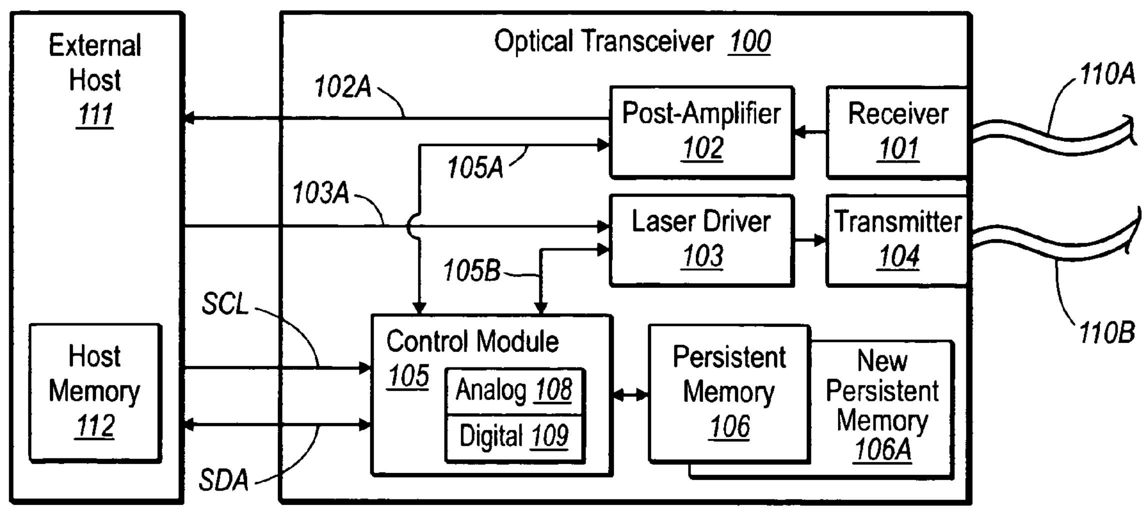
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1 G, 2 G, 4 G, 8 G, 10 G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
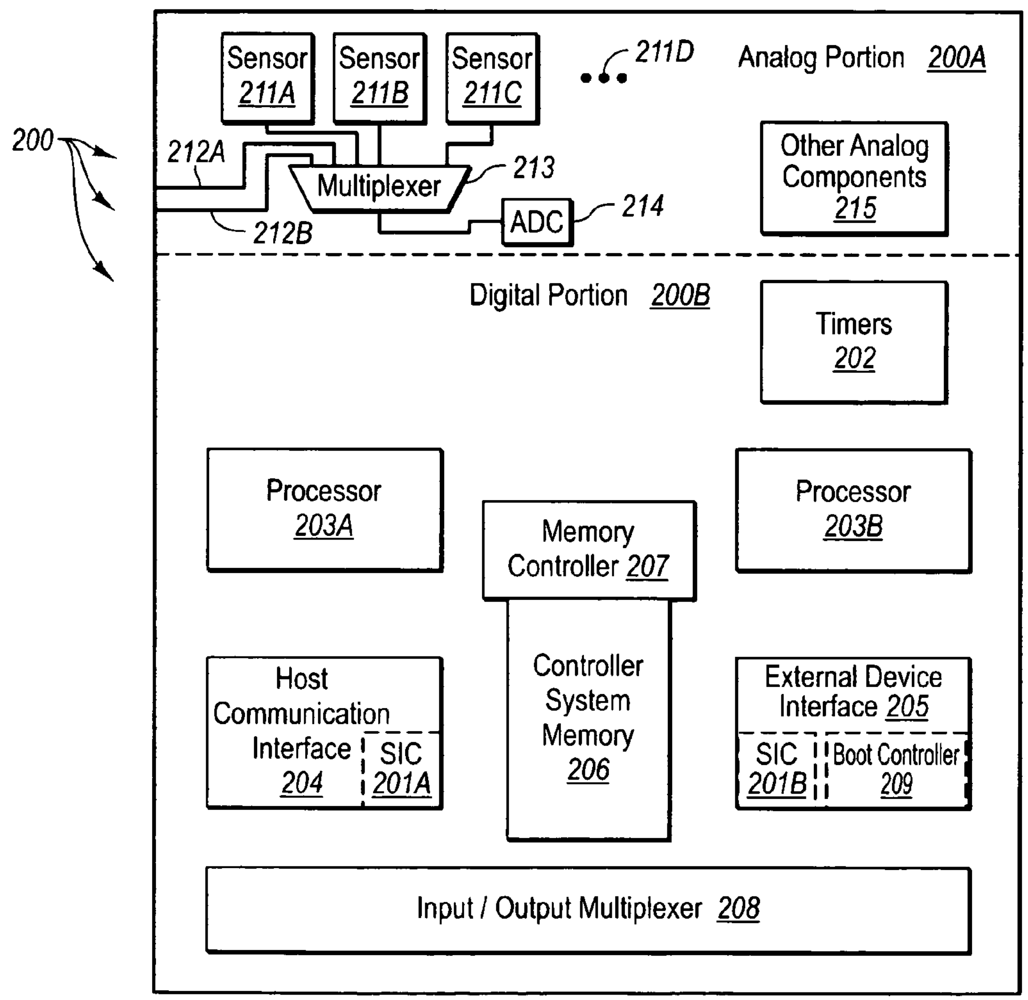
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as $I^2C$ shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as $I^2C$ or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate to an optical transceiver that may be configured to dynamically adjust the boot speed of the optical transceiver boot process.

Figure 3:
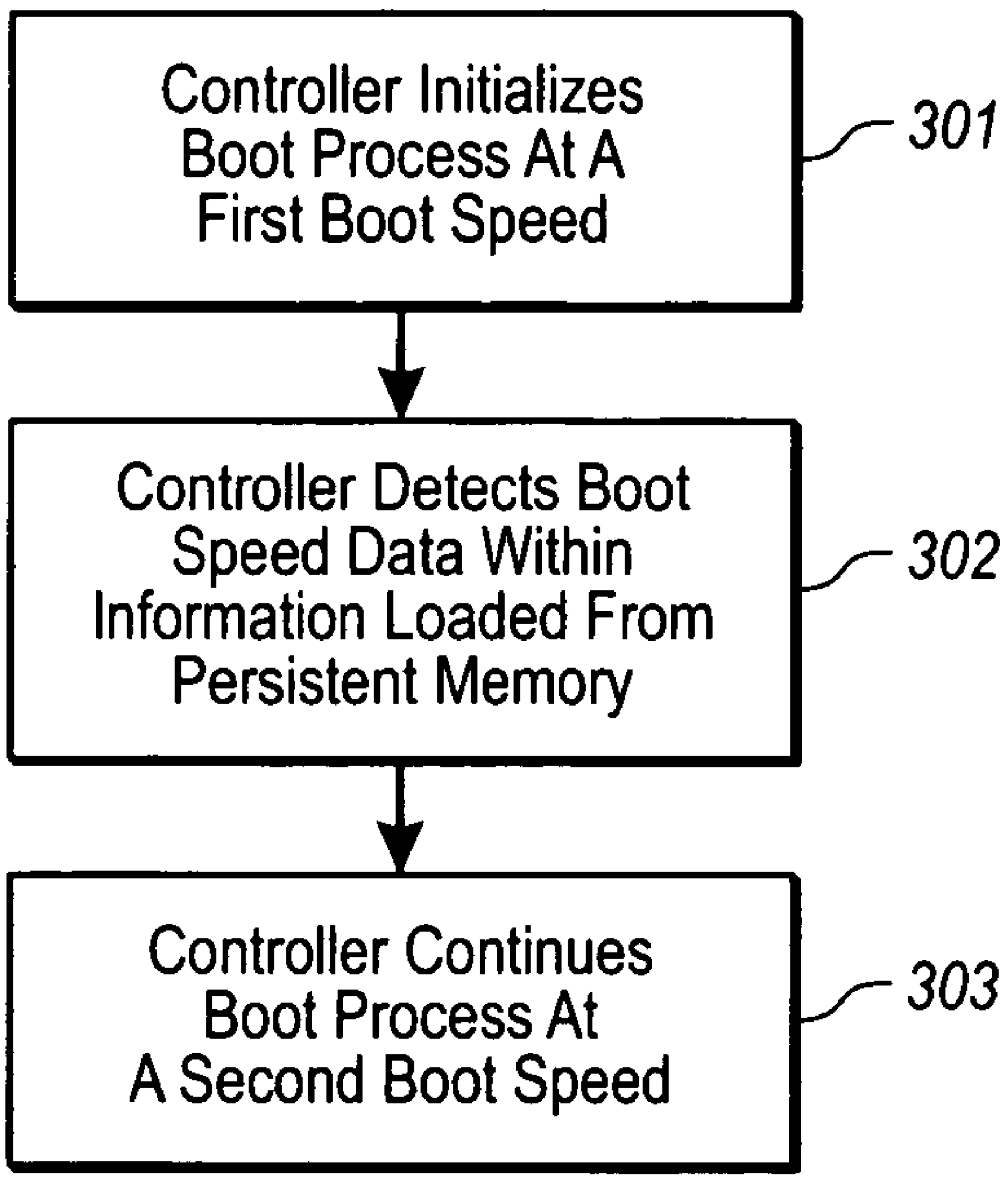
FIG. 3 illustrates a flowchart of a method for a controller to dynamically change the speed of an optical transceiver boot process in accordance with the principles of the present invention.

Referring to FIG. 3, a flowchart of a method 300 for an optical transceiver to dynamically adjust the speed of the transceiver boot process is illustrated. A controller, which may be a boot controller such as boot controller 209 of FIG. 2, a processor such as processors 203 of FIG. 2, or any other device that is capable of initiating a boot process, initializes the boot process at a first boot speed (act 301), which causes information, which may be microcode, to begin to be loaded from the persistent memory to the system memory. The first boot speed will be a general boot speed that is slow enough for any persistent memory source utilized by the optical transceiver to implement. This enables different persistent memories to be used without reconfiguring the controller prior to the boot process. The controller may initiate a cold boot process when the optical transceiver has been in an off mode for a period of time or the controller may initiate a warm reboot after the optical transceiver has been in operation for a period of time.

Referring to FIG. 2, external device interface 205 is shown. In addition to the functionality discussed previously, external device interface 205 may also include a process, boot controller 209 may begin loading information in the form of microcode from persistent memory 106 to into controller system memory 206 at first boot speed as described previously.

Referring again to FIG. 3, the controller detects boot speed data within the information loaded from the persistent memory (act 302). This boot speed data defines a faster boot speed for the boot process. The boot speed data is entered into the persistent memory by an optical transceiver manufacturer during manufacturing or by a user at a later time. The use of the boot speed data allows the manufacturer or user to determine a faster boot speed that is desirable for a particular optical transceiver.

For example, while initializing the boot process, boot controller 209 of FIG. 2 may analyze the microcode being loaded from persistent memory 106 into controller system memory 206 at the first boot speed. The microcode may be structured to include, among other things, data that initializes transceiver 100 hardware during the boot process. For example, the first byte may initialize controller system memory 206 by indicating the amount of the microcode to be loaded from persistent memory 106. The next few bytes may indicate what location in memory to write the remaining microcode from persistent memory 106 to and may also verify that the boot process is valid. The next byte after that may contain data that corresponds to the faster boot speed for the boot process. The actual order of the bytes may be varied in any way necessary. However, there is an incentive to place the boot speed data amongst the early bytes loaded so that the majority of the microcode may be loaded at the faster rate.

In response to detecting the boot speed data, the controller continues the boot process by loading additional information from the persistent memory to the system memory at a second boot speed that is faster than the first boot speed (act 303).. However, the persistent memory may only be able to implement the boot process up to a certain boot speed. Obviously, the controller may not continue the boot process at a speed the persistent memory can not handle. Thus, the second boot speed should always be less than or equal to the actual boot speed the persistent memory can implement, which in most cases will be faster than the first boot speed. This process helps ensure that faster boot speeds are achieved, especially when a new persistent memory is added to the optical transceiver. For example, upon detection of the boot speed data, boot controller 209 may continue loading the remaining microcode stored in persistent memory 106 into controller system memory 206 at the second, faster boot speed.

Referring again FIGS. 1 and 2, suppose that the existing persistent memory 106 was replaced with a new persistent memory 106A. New persistent memory 106A would be loaded by a manufacturer or user with microcode containing boot speed data that defines a faster boot speed. As mentioned, boot controller 209 would not have to be reconfigured when adding the new persistent memory 106A. Boot controller 209 would initiate the boot process during a cold or warm boot by directing the new persistent memory 106A to load microcode to controller system memory 206 at the slow, general boot speed that all persistent memories can implement. The boot controller 209 would then analyze the microcode being loaded and would detect the boot speed data corresponding to the faster boot speed. Boot controller 209 would then continue the boot process at a new, faster boot speed by directing the new persistent memory 106A to load the remaining microcode at the new boot speed. This process may be repeated any time a persistent memory loaded with faster boot speed data is added to transceiver 100.

In an alternative embodiment, the boot process is controlled by one of the processors 203. Processors 203 may initiate the boot process during either a cold or warm boot by sending directions to boot controller 209 or directly to persistent memory 106 to have microcode loaded into controller system memory 206 at the first boot speed that is slow enough for any persistent memory 106 to implement.

While initializing the boot process, processors 203 may analyze the microcode being loaded from persistent memory 106 into controller system memory 206. This may allow processors 203 to detect the data corresponding to a faster boot speed. Upon detection of the data, processors 203 may direct persistent memory 106 to continue loading the remaining microcode into controller system memory 206 at the new, faster boot speed. In this way, processors 203 may continue the boot process after adjusting to the new, faster second boot speed.

Accordingly, the principles of the present invention provide for a method to dynamically adjust the boot speed of the optical transceiver boot process. This removes the need to configure the controller to the actual boot speed of the persistent memory before the boot process begins. Instead, the controller initiates the boot process at a boot speed that all persistent memories can implement. During the boot process, the controller detects boot speed data that specifies a faster boot speed. This causes the boot controller to adjust the boot process to the new, faster boot speed. The method is especially useful any time a new persistent memory is added to the optical transceiver. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an optical transceiver including a control unit, a persistent memory that is external to the control unit, a boot controller that is included within the control unit, and a system memory that is included within the control unit, wherein the boot controller is configured to load information from the persistent memory to the system memory during a boot process, a method for dynamically adjusting a boot speed of the boot process, the method comprising:

an act of the boot controller initiating a boot process at a first boot speed to thereby begin loading information from the persistent memory to the system memory;

an act of the boot controller detecting boot speed data within the information loaded from the persistent memory to the system memory after the act of the boot controller initiating, the boot speed data representing a second boot speed configured for the optical transceiver; and in response to the act of the boot controller detecting, an act of the boot controller continuing the boot process by loading additional information from the persistent memory to the system memory at the second boot speed, the second boot speed being faster than the first boot speed.

2. A method in accordance with claim 1, wherein the first boot speed is a general boot speed that can be implemented by the persistent memory, the general boot speed being a boot speed that any persistent memory utilized by the optical transceiver can implement.

3. A method in accordance with claim 1, wherein the second boot speed is less than or equal to the actual boot speed that the persistent memory can implement.

4. A method in accordance with claim 1, wherein the control unit includes both an analog portion and a digital portion.

5. A method in accordance with claim 1, wherein the control unit includes a processor.

6. A method in accordance with claim 1, wherein the boot speed data is loaded from the persistent memory to the system memory and detected by the boot controller early in the boot process.

7. A method in accordance with claim 1, wherein the boot process is a cold boot process.

8. A method in accordance with claim 1, wherein the boot process is a warm boot process.

9. A method in accordance with claim 1, wherein the optical transceiver is one of a 1 G laser transceiver, a 2 G laser transceiver, a 4 G laser transceiver, a 8 G laser transceiver, or a 10 G laser transceiver.

10. A method in accordance with claim 1, wherein the optical transceiver is a laser transceiver suitable for fiber optic links greater than 10 G.

11. A method in accordance with claim 1, wherein the optical transceiver is one of a XFP laser transceiver, a SFP laser transceiver, or a SFF laser transceiver.

12. An optical transceiver comprising:

a control unit:

a persistent memory that is external to the control unit;

a system memory that is included within the control unit;

a boot controller that is included within the control unit, the boot controller configured to:

initiate a boot process at a first boot speed to thereby begin loading information from the persistent memory to the system memory;

detect boot speed data within the information loaded from the persistent memory to the system memory while initializing the boot process, the boot speed data representing a second boot speed configured for the optical transceiver; and in response to detecting the boot speed data, continue the boot process by loading additional information from the persistent memory to the system memory at the second boot speed, the second boot speed being faster than the first boot speed.

13. An optical transceiver in accordance with claim 12, wherein the first boot speed is a general boot speed that the persistent memory is configured to implement, the general boot speed being a boot speed that any persistent memory utilized by the optical transceiver is configured to implement.

14. An optical transceiver in accordance with claim 12, wherein the second boot speed is less than or equal to the actual boot speed that the persistent memory is configured to implement.

15. An optical transceiver in accordance with claim 12, wherein the control unit includes both an analog portion and a digital portion.

16. An optical transceiver in accordance with claim 12, wherein the control unit includes a processor.

17. An optical transceiver in accordance with claim 12, wherein the boot controller is configured to load the boot speed data from the persistent memory to the system memory and is configured to detect the boot speed data early in the boot process.

18. An optical transceiver in accordance with claim 12, wherein the optical transceiver is one of a 1 G laser transceiver, a 2 G laser transceiver, a 4 G laser transceiver, a 8 G laser transceiver, or a 10 G laser transceiver.

19. An optical transceiver in accordance with claim 12, wherein the optical transceiver is a laser transceiver suitable for fiber optic links greater than 10 G.

20. An optical transceiver in accordance with claim 12, wherein the optical transceiver is one of a XFP laser transceiver, a SFP laser transceiver, or a SFF laser transceiver.

* * * * *

UNITED STATES PATENT AND TRADEMARK OFFICE

CERTIFICATE OF CORRECTION

PATENT NO. : 7,522,840 B2
APPLICATION NO. : 11/114983
DATED : April 21, 2009
INVENTOR(S) : Dybsetter et al.

It is certified that error appears in the above-identified patent and that said Letters Patent is hereby corrected as shown below:

Column 6
Line 8, before “into” delete “to”
Line 40, after “(act 303)” delete 2nd “.”
Line 54, change “again” to --again to--

Column 8
Line 27, change “a 8 G” to --an 8 G--

Column 9
Line 8, change “a 8 G” to --an 8 G--

Signed and Sealed this

Sixteenth Day of February, 2010

David J. Kappos
*Director of the United States Patent and Trademark Office*